Aug. 2, 1955  R. C. TUTTLE  2,714,272
CONTROL MEANS FOR AUTOMATIC FISHING REELS
Filed July 9, 1954  2 Sheets-Sheet 1
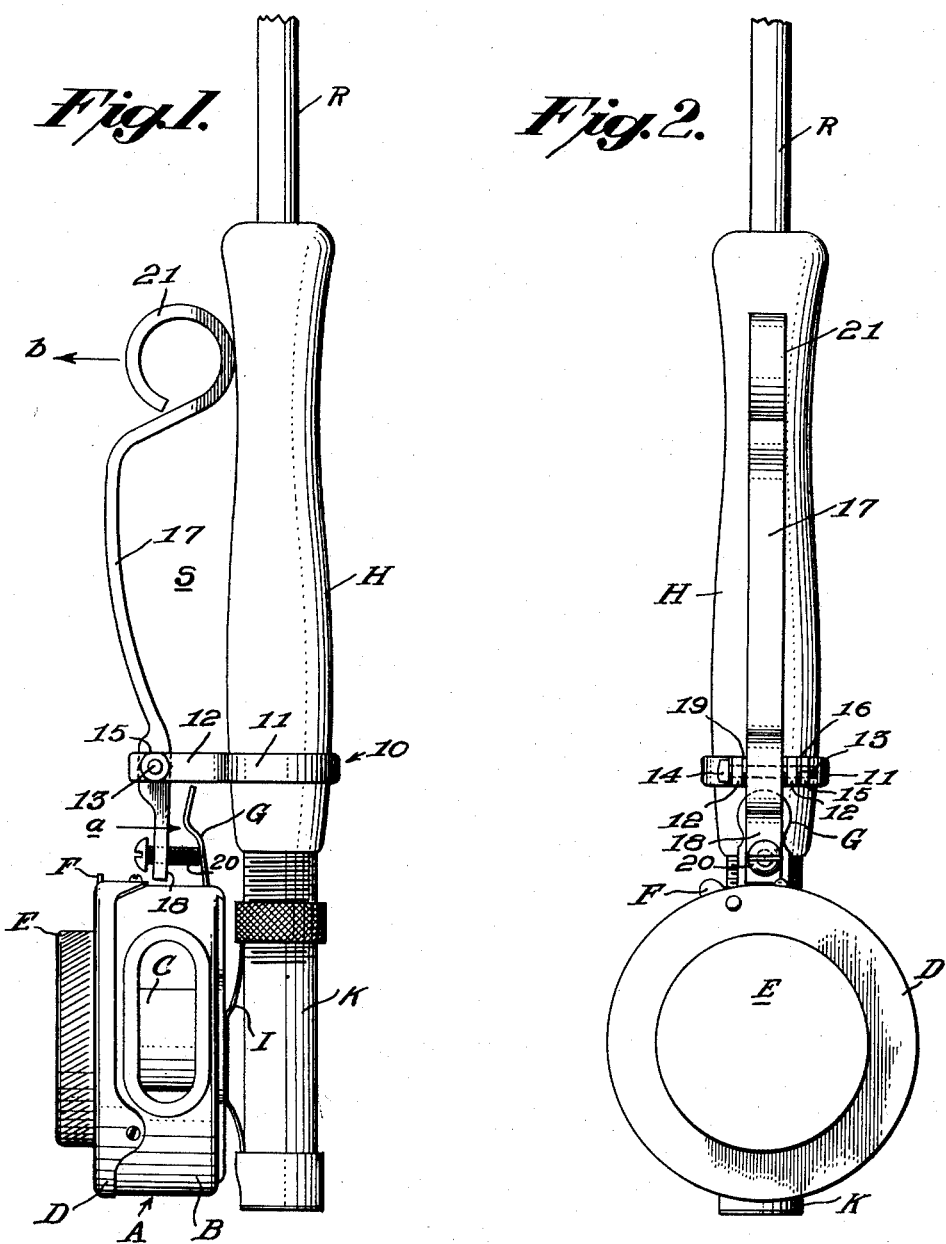
INVENTOR
Richard C. Tuttle
BY
ATTORNEY Aug. 2, 1955    R. C. TUTTLE    2,714,272
CONTROL MEANS FOR AUTOMATIC FISHING REELS
Filed July 9, 1954    2 Sheets-Sheet 2
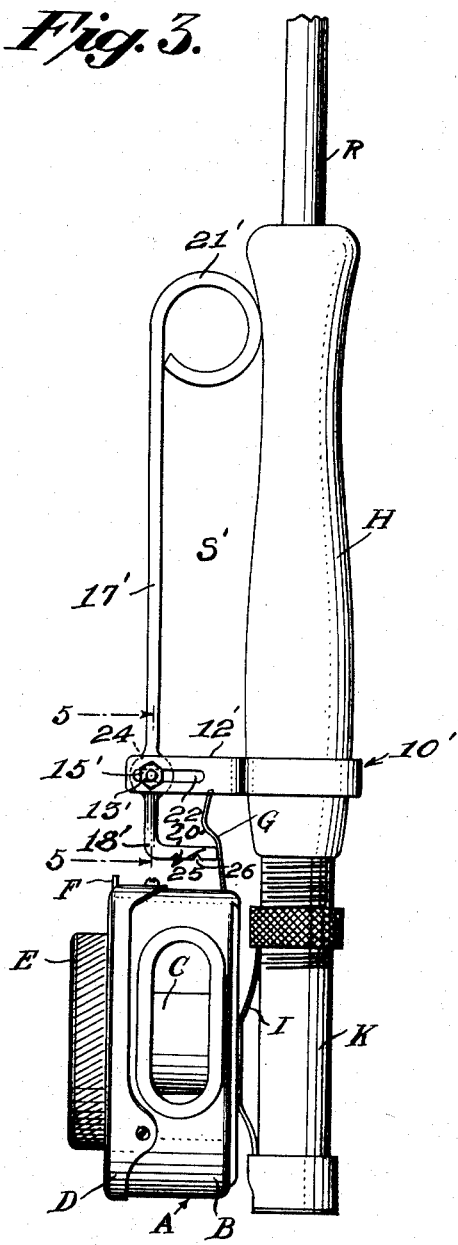
*Fig. 3.*
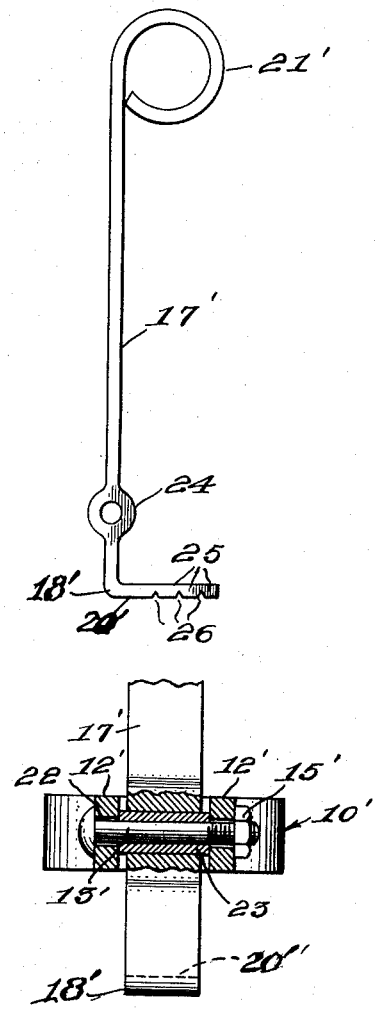
*Fig. 4.*
*Fig. 5.*
INVENTOR
Richard C. Tuttle
BY
ATTORNEY

United States Patent Office 2,714,272
Patented Aug. 2, 1955

2,714,272

CONTROL MEANS FOR AUTOMATIC FISHING REELS

Richard C. Tuttle, Salida, Colo.

Application July 9, 1954, Serial No. 442,350

4 Claims. (Cl. 43—25)

This invention relates to control means for automatic fishing reels, and more particularly to a device attachable to a fishing rod, for controlling a rod mounted automatic reel of the type embodying a spring wound line-controlling spool and a spool brake having a finger engageable releasing arm.

Automatic reels of the foregoing type are frequently mounted on the butt end of a fishing rod, that is, the handle of the rod will be between the rod proper and the reel, so that the reel is behind the operator's hand when in use. The releasing arm of a reel in this position must be operated either by the little fingers of the hand grasping the handle, or the operator must use his other hand to actuate the releasing arm. Due to the fact that the average person does not have the ability to use his little finger for this purpose, he tends to use his other hand but this is undesirable as it may be necessary to have the other hand free for handling a net or other purposes.

Having in mind the defects of the prior art apparatus, is is the primary object of the present invention to provide an attachment whereby brake releasing pressure may be exerted on the reel release arm with minimum effort and inconvenience on the part of the fisherman.

A further object of the invention is to provide an attachment for automatic fishing reels attachable to fishing rod handles and wherein the attachment is readily adapted for support on the fishing rod handle.

A still further object of the invention is to provide an attachment of the general character referred to which is simple and economical in construction and is capable of being applied for use quickly and with minimum effort, and has efficiency in operation.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts through the several figures and in which:

Figure 1 is a view in elevation showing an automatic spring-wind reel having the usual connection with the handle portion of a fishing rod, and further showing the application of the attachment in accordance with one structural embodiment of the present invention;

Figure 2 is a plan view of the structure shown in Figure 1.

Figure 3 is a side view in elevation of a modifier embodiment of the invention;

Figure 4 is a side view in elevation of the lever elements embodied in the structure of Figure 3, and Figure 5 is an enlarged fragmentary sectional view taken on line 5—5 of Figure 3.

Referring now to the drawings, specifically to Figures 1 and 2, A designates a known form of automatic spring-motor fishing reel, such as is disclosed in U. S. Patent No. 2,290,268, which comprises a casing B having a line receiving spool C rotatably journalled in said casing. The spool is driven by a spring motor drive that is located within a housing D which forms a cover for the casing B, and is connected with a rotatably mounted hand wheel E for winding the spring motor and having a pawl and ratchet connection with the housing D of which the pawl F is indicated on the drawing. The spool C is normally retained against rotation under action of the wound spring by a brake having a release arm G which projects through an aperture in the casing B to a finger-accessible position adjacent the handle H of a fishing rod R to which the reel A is secured by a clip I to a shank K projecting from the end of the handle H.

With the foregoing arrangement of a fishing rod handle and line-controlling reel, it will be observed that the brake release arm G is disposed adjacent the free end of the handle H and is operative upon pressure thereon in a direction toward the handle as indicated by arrow $a$. Since a fisherman grasps the handle H within the palm of one hand, the arm G must be actuated by the little finger, but this is difficult for most people, and, in fact, the arm is not always in convenient access to the little finger should the handle H be grasped near the rod R.

It is quite important in fishing that the brake release arm G be readily accessible and that it be conveniently operable because in drawing in a fish, the fisherman must work fast and in many instances, the line is grasped by the other hand and drawn toward the reel in successive increments. The line slack resulting from such manual drawing of the line must be taken up on the spool C as quickly as possible. Due to the difficulty of operating the arm G with the little finger, the hand drawing the line is also used for actuating the arm G and this results in difficulty and inefficiency.

The present invention provides for more convenient and dependable operation of the brake release arm G and, as shown in Fig. 1, one embodiment of the invention comprises a bracket 10, which is conveniently attachable to and releasably mountable on the handle H, and a lever 17 pivotally supported by the bracket 10 and operable by the fisherman's hand which grasps the handle H to actuate the release arm G. The elongated lever 17 is disposed lengthwise of and spaced from the rod handle H and provides therewith a finger receiving space S when the handle H is gripped in the palm of a hand.

The bracket 10 comprises a generally U-shaped member including an arcuate portion 11 for encircling and gripping the handle, and a pair of legs 12 having aligned apertures receiving a bolt 13 whose head 14 is disposed outwardly of one leg and a nut 15 threaded on the free end of the bolt outwardly of the other leg. Washers 16 may be disposed between the outer faces of the arms 12 and the head 14 and nut 15. The bracket 10 is preferably yieldable and the grip of the arcuate portion 11 on the handle H is effected by movement of the legs 12 toward each other by means of the bolt 13.

The lever 17 is pivotally connected to the bracket 10 at a point adjacent one end 18 thereof and such pivotal connection is effected by passage of the bolt 13 through a journal in the lever which is disposed between the legs 12 of the bracket 10. In order to avoid objectionable space between the legs for effective pivoting action of the lever 17, washers 19 are preferably disposed intermediate the legs and the lever 17. An abutment 20 is carried by the end 18 of the lever 17 for engagement with the brake release arm G. The abutment preferably comprises a screw that is adjustably threaded in the end 18 of the lever to enable accurate adjustment between the lever 17 and the arm G. At its opposite end lever 17 is provided with a forefinger receivable loop 21 which normally engages the handle H adjacent the inner end thereof.

In the use of the improved attachment, as described, the fisherman grasps the handle H within the palm of a hand with the forefinger extending through the loop 21 and with the remaining fingers disposed within the space S. Accordingly it is necessary only to exert slight outward pressure on the loop 21 by the forefinger in the direction of arrow *b* (Fig. 1) to swing the lever 17 and press the abutment 20 against the arm G in order to release the brake. It will be noted that substantial leverage is provided by the lever 17 and easy and accurate control of the spool C is realized with a minimum effort and attention on the part of the fisherman.

A modified embodiment of the invention is shown in Figs. 3, 4 and 5 wherein the bracket 10' is of the same U-form as the bracket 10 shown in Figs. 1 and 2, but the legs 12' thereof are provided with longitudinal aligned slots 22 in which is slidably disposed the shank of a pivot bolt 13'. A sleeve 23 is mounted on the bolt 13' and disposed between the bracket legs 12' to space the legs 12' and prevent their binding the lever 17'. The bolt is provided with a nut 15' which upon being drawn up forces the legs 12' into firm frictional contact with the ends of the sleeve 23 whereby the bolt is retained in selected position lengthwise of the legs and the sleeve provides a pivot fulcrum for the lever 17' which includes a hub portion 24 journalled on said sleeve 23.

The lever 17' includes a finger receiving loop 21' similar to the lever 17 shown in Figs. 1 and 2 and which normally engages the fishing rod handle H. The lever 17' may differ from the lever 17, however, to the extent that it may be straight and provide a more convenient finger receiving space S. The structure as above described provides for adjustment of the lever pivot toward and from the handle H and the brake release arm G and in order to provide for operative contact between the lever 17' and the arm G in selected position of the lever, the end 18' of the lever is provided with an abutment 20' constructed by a right angular end portion that is divided into a plurality of segments 25 that are formed by a plurality of weakening notches 26 transverse the abutment end 20', whereby any desired number of segments 25 may be readily broken off so that the end of the abutment 20' may properly engage the arm G, as is indicated in Fig. 3.

In operation, the foregoing modification functions in the same manner as the embodiment shown in Figs. 1 and 2. The modified embodiment has the adjustable mounting of the lever by means of the adjustment of the pivot bolt along the slots 22 which enables accommodation of the attachment to different types and structures of rods and reels. In addition the segmental abutment provides both adjustability and rigidity of the abutment as its length can be varied to suit the particular requirements and conditions. Various modifications may be made within the scope of the invention and, for example, the brackets 10, 10' and the levers 17 and 17' may be of other forms and may be constructed of metal, plastic, or other material, the essential consideration being that the spool control arm G be capable of operation with minimum effort and attention at a point adjacent the inner end of the rod handle.

Although a certain specific embodiment of the invention has been shown and described, it is obvious that many modifications thereof are possible. The invention, therefore, is not to be restricted except in so far as is necessitated by the prior art and by the spirit of the appended claims.

I claim:

1. An attachment for a fishing rod handle having an automatic spring-wind reel secured to the outer end thereof and wherein the reel includes a brake release arm disposed closely adjacent said outer end of the handle and being operable upon pressure thereon in a direction toward the handle; said attachment comprising an elongated lever for extending lengthwise of the handle in spaced relation thereto, means supportable by the handle and pivotally supporting said lever intermediate the ends thereof, abutment means on one end of the lever engageable with said brake release arm for operating same, said abutment means being positioned a short distance from the pivotal support of the lever, and a fore-finger engageable loop on the opposite end of said lever having only a curved portion thereof normally in contact with the handle and spacing a portion of the lever between said loop and said means pivotally supporting said lever from the handle a distance so as to accommodate other fingers of the operator between said handle and said portion; said loop being at a substantially greater distance from the pivotal support than the abutment means for effecting substantial inward movement of said brake arm releasing means upon relatively light finger pressure on said loop in a direction outwardly of said handle.

2. An attachment according to claim 1, wherein said abutment means comprises a screw adjustably threaded through said one end of said lever and having one end engaging the outer face of said brake release arm.

3. An attachment according to claim 1, wherein said support means comprises a U-shaped bracket whose bight portion is in engagement with said handle, and a bolt extending through the legs of the bracket and through said lever.

4. An attachment according to claim 1, wherein said abutment means comprises a relatively short end portion of the lever which is disposed at right angles to the body portion thereof and which is provided with a plurality of weakening notches whereby portions of the same may be broken off to provide proper length thereof for engagement with the brake release arm.

References Cited in the file of this patent

UNITED STATES PATENTS

| | | |
|---|---|---|
| 485,208 | Mount | Nov. 1, 1892 |
| 497,341 | Porter | May 16, 1893 |
| 683,940 | Howe | Oct. 8, 1901 |
| 2,283,039 | Bremiller | May 12, 1942 |
| 2,493,766 | Luton | Jan. 10, 1950 |

FOREIGN PATENTS

| | | |
|---|---|---|
| 71,423 | Norway | Dec. 23, 1946 |